Dec. 6, 1966  W. G. REDMOND, JR  3,289,490
OVERRIDE MECHANISM
Filed Oct. 22, 1964

WILLIAM G. REDMOND JR
INVENTOR

BY Robert M. Sperry

ATTORNEY 3,289,490
OVERRIDE MECHANISM
William G. Redmond, Jr., Arlington, Tex., assignor to Ling-Temco-Vought, Inc., Dallas, Tex., a corporation of Delaware
Filed Oct. 22, 1964, Ser. No. 405,780
3 Claims. (Cl. 74—469)

This invention relates to override mechanism and is particularly directed to novel mechanism for electromechanically overriding an automatic pilot system or the like.

In devices having automatic controls, such as an airplane having an automatic pilot system, it sometimes becomes necessary or desirable for the human operator to assume temporary control of the device during a period when the device is being operated by the automatic control system. This can, obviously, be accomplished by turning off or disengaging the automatic control system. However, in emergencies, such actions are time consuming and disconcerting and, hence, may spell the difference between success and failure of corrective action taken by the human operator to avoid disaster. Some automatic control systems make it possible for the human operator to manually override the automatic control system, without turning off or disengaging the control system. However, many of the systems attempt to oppose such overriding and, thus, require considerable exertion by the human operator to effect overriding. Other systems include electronic means for sensing the overriding action and disengaging the automatic control system until such overriding action has ceased. On the other hand, these electronic devices are often extremely complex and expensive and add substantially to the weight of the automatic control system.

These disadvantages of the prior art are overcome with the present invention and novel electro-mechanical overriding means are provided which are simple in construction, low in cost, easy to install and negligible in weight.

The advantages of the present invention are preferably attained by providing electromechanical override mechanism comprising a shaft rotatable by the automatic control system to regulate desired means, a crank member connected to rotate with said shaft, mechanically operable switch means controlling a desired electrical means, switch actuator means carried by said shaft and slideable axially with respect to said crank member between a switch opening position and a switch closing position, resilient means urging said switch actuator means to said switch closing position, link means mounted on said shaft and coupled to said desired means for delivering torque received through said switch actuator means from said crank member, and camming means coupling said switch actuator means with said crank member and serving to force said switch actuator means to said switch opening position in response to torque applied between said link means and said shaft exceeding a predetermined value.

Accordingly, it is an object of the present invention to provide improved mechanism for overriding automatic control systems.

Another object of the present invention is to provide novel mechanism for overriding automatic control systems wherein said mechanism is simple in construction, low in cost, easy to install and negligible in weight.

A further object of the present invention is to provide novel electro-mechanical means for overriding automatic control systems.

A specific object of the present invention is to provide novel override mechanism comprising a shaft rotatable to control desired means, a crank member connected to rotate with said shaft, mechanically operable switch means controlling a desired electrical means, switch actuator means carried by said shaft and slideable axially with respect to said crank member between a switch opening position and a switch closing position, resilient means urging said switch actuator means to said switch closing position, link means mounted on said shaft and coupled to said desired means for delivering torque received through said switch actuator means from said crank member, and camming means coupling said switch actuator means with said crank member and serving to force said switch actuator means to said switch opening position in response to torque applied between said link means and said shaft exceeding a predetermined value.

These and other objects and features of the present invention will be apparent from the following detailed description taken with reference to the figures of the accompanying drawing.

Figure 1:
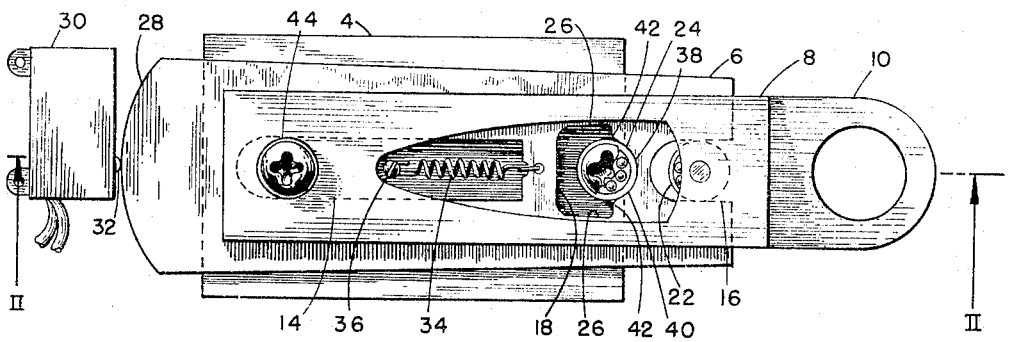
FIGURE 1 is front elevation of an override mechanism embodying the present invention.

In the form of the present invention chosen for purposes of illustration in the drawing, FIG. 1 shows a shaft 2 which may be rotated by a servomotor or the like to control any desired means, not shown, such as throttles, attitude control devices and the like. Torque is supplied by the shaft 2 through the override mechanism, including crank member 4, switch actuator means 6 and link means 8 to suitable linkage connections, not shown, coupled to yoke 10 of link means 8. These linkage connections deliver torques to the mechanisms to be controlled and to the appropriate manual control means.

Figure 2:
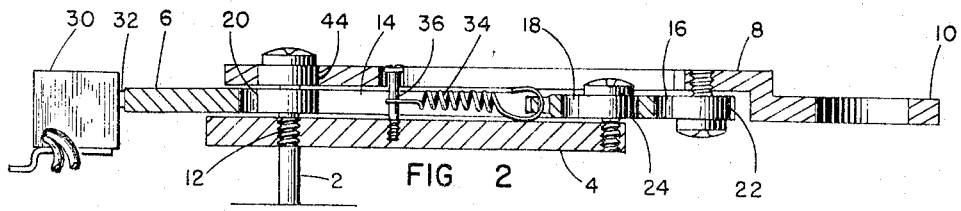
FIGURE 2 is a sectional view of the device of FIG. 1 taken on the line II—II thereof.
Figure 3:
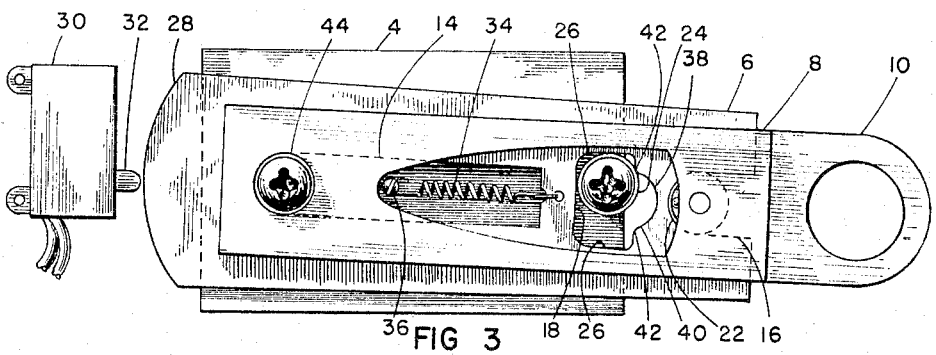
FIGURE 3 is a view showing the device of FIG. 1 in its override position.

As shown, crank member 4 is a flat plate which is rigidly connected to shaft 2, as seen at 12, and extends perpendicular to the axis of shaft 2. The switch actuator means 6 is a flat plate formed with a plurality of elongated guide apertures 14 and 16 and a camming aperture 18. A ball bearing 20, carried by shaft 2, engages guide aperture 14 of the switch actuator means 6 while a second ball bearing 22 carried by link means 8 engages guide aperture 16. In addition, a cam follower wheel 24 carried by crank member 4 engages the camming aperture 18 of switch actuator means 6. This mounting permits the switch actuator means 6 to slide axially with respect to crank member 4 whereas rotation of switch actuator means 6 relative to crank member 4 may be limited by engagement of cam wheel 24 with the edges 26 of camming aperture 18 or by bearings 20 and 22 "bottoming" in the respective slots 14 and 16. One end 28 of switch actuator means 6 projects beyond the shaft engaging end of crank member 4 and is arcuately formed with the center of the arc being concentric with shaft 2 when the switch actuator means 6 is in the position shown in FIG. 1. A mechanically operable switch 30 is mounted adjacent the end 28 of switch actuator means 6 and has an actuating member 32 which is positioned to be depressed by end 28 of switch actuator means 6 to close switch 30 when the switch actuator means 6 is in the position of FIG. 1 and to be released to open switch 30 when the switch actuator means 6 is in the position of FIG. 3. Resilient means 34 is connected between the switch actuator means 6 and a stud 36 carried by the crank member 4 to urge switch actuator means 6 to the switch closing position of FIG. 1. To open switch 30, the camming aperture 18 of switch actuator means 6 is formed with a camming surface 38 having a recessed portion 40 flanked by a pair of shoulder portions 42. Finally, link means 8 is pivotally secured to shaft 2, as seen at 44.

In operation, torque is supplied from the automatic pilot system through an electric clutch, controlled by switch 30, to rotate shaft 2. This torque is applied through crank 4 and cam wheel 24 to switch actuator means 6 and through ball bearing 22 and guide aperture 16 to cause pivoting of switch actuator means 6 and link means 8 about ball bearing 20 and shaft 2. If the applied toruqe is less than a predetermined value, established by resilient means 34, switch actuator means 6 will remain in the position of FIG. 1 and the torque will be applied through shoulder portions 42 of camming aperture 18 and cam wheel 24 to rotate crank member 4, switch actuator means 6 and link means 8 as a unit. Thus, under normal conditions, the automatic pilot can vary the position of shaft 2 and, through the override mechanism, can control the setting of the throttle or other means. However, in the event the human pilot decides to assume control, he applies sufficient force to the appropriate control means to cause a torque to be supplied to yoke 10 of link means 8 which exceeds the predetermined value established by resilient means 34. When this occurs, one of the shoulder portions 42 of camming surface 38 will "ride up" on cam wheel 24, forcing switch actuator means 6 to move to the switch opening position of FIG. 3, against the action of resilient means 34, and opening switch 30. As indicated above, switch 30 is connected to control an electric clutch coupling the automatic pilot system to shaft 2 and serves to disengage the automatic pilot system when the torque applied to yoke 10 of link means 8 is greater than the predetermined value established by resilient means 34 and to reengage the automatic pilot system when the torque applied to yoke 10 is less than the predetermined value. In this way, when the pilot manually overrides the automatic pilot system, switch 30 will be opened to disengage the automatic pilot system and prevent the automatic pilot system from applying back pressure to "fight" the human pilot. Because end 28 of the switch actuator means 6 is formed arcuate, as described above, switch 30 may be operated with the axis of the override mechanism as substantially any orientation from zero to nearly 90° with respect to a line joining switch 30 with shaft 2. If desired, additional switches may be appropriately positioned to permit actuation throughout 360° rotation of the override mechanism.

Obviously, if desired, switch actuator means 6 could be formed solid and bearings 20 and 22 could be mounted thereon to engage appropriate apertures which could be formed in crank member 4 and link means 8. Moreover, the locations of cam wheel 24 and camming aperture 18 could be interchanged. Furthermore, projecting shoulders could be substituted for the apertures 14, 16 and 18, if desired. In addition, numerous other variations and modifications may be made without departing from the present invention. Accordingly, it should be clearly understood that the form of the invention described above and shown in the figures of the accompanying drawing is illustrative only and is not intended to limit the scope of the invention.

What is claimed is:
1. Override mechanism comprising:
a shaft rotatable to control desired means,
a crank member connected to rotate with said shaft, mechanically operable switch means for controlling a desired electrical means,
switch actuator means carried by said shaft and slidable axially with respect to said crank member between a switch opening position and a switch closing position,
resilient means urging said switch actuator means to said switch closing position,
link means mounted on said shaft and adapted to be coupled to said desired means for delivering to said desired means torque received through said switch actuator means from said crank member, and
camming means coupling said switch actuator means with said crank member and serving to force said switch actuator means to said switch opening position in response to torque applied between said link means and said shaft exceeding a predetermined value.

2. Override mechanism comprising:
a shaft rotatable to control desired means,
a crank member connected to rotate with said shaft, mechanically operable switch means for controlling a desired electrical means,
switch actuator means slideably axially with respect to said crank member between a switch opening position and a switch closing position,
a cam surface formed on said switch actuator means and having an indented portion flanked by a pair of shoulder portions,
a cam wheel mounted on said crank member and engaging said cam surface,
resilient means urging said indented portion of said cam surface to engage said cam wheel and urging said switch actuator means to said switch closing position, and
link means mounted on said shaft and adapted to be coupled to said desired means and coupled to said actuator means for delivering to said desired means torque received through said switch actuator means from said crank member and serving to rotate with said switch actuator means and said crank member when the torque supplied between said link means and said shaft is less than a predetermined value and serving to force said shoulder portions of said cam surface to engage said cam wheel to drive said switch actuator means to said switch opening position when the torque supplied between said link means and said shaft exceeds said predetermined value.

3. The apparatus of claim 2 having the switch engaging portion of said switch actuator means formed concentric with said shaft.

References Cited by the Examiner

UNITED STATES PATENTS

| | | | |
|---|---|---|---|
| 2,161,732 | 6/1939 | Von Manteuffel | 74—469 |
| 2,237,719 | 4/1941 | Tiebel | 74—469 |
| 2,511,734 | 6/1950 | Murphy | 74—469 |

MILTON KAUFMAN, *Primary Examiner.*